(12) United States Patent
Bubulka et al.

(10) Patent No.: US 7,862,058 B2
(45) Date of Patent: Jan. 4, 2011

(54) FABRICATED VEHICLE AXLE

(75) Inventors: John Stephen Bubulka, Westchester, IL (US); Ashley Thomas Dudding, Yorkville, IL (US); Jerome Lim Cortez, Tinley Park, IL (US)

(73) Assignee: Hendrickson USA L.L.C., Itasca, IL (US)

( * ) Notice: Subject to any disclaimer, the term of this patent is extended or adjusted under 35 U.S.C. 154(b) by 285 days.

(21) Appl. No.: 12/046,722

(22) Filed: Mar. 12, 2008

(65) Prior Publication Data

US 2009/0230760 A1    Sep. 17, 2009

(51) Int. Cl.
*B62D 7/18*    (2006.01)
(52) U.S. Cl. .................... 280/93.512; 280/124.125; 301/124.1
(58) Field of Classification Search ............ 280/93.512, 280/124.125; 301/124.1
See application file for complete search history.

(56) References Cited

U.S. PATENT DOCUMENTS

| | | | | |
|---|---|---|---|---|
| 1,823,158 | A * | 9/1931 | Spatta et al. ............. | 301/124.1 |
| 1,899,347 | A * | 2/1933 | Spatta et al. ............. | 301/124.1 |
| 5,588,660 | A * | 12/1996 | Paddison ................ | 280/93.512 |
| 5,741,027 | A * | 4/1998 | Stroh et al. ................. | 280/781 |
| 5,810,377 | A * | 9/1998 | Keeler et al. ........... | 280/93.512 |
| 5,865,452 | A | 2/1999 | Chalin | |
| 6,394,473 | B1 * | 5/2002 | Platner ................... | 280/124.1 |
| 6,609,764 | B2 * | 8/2003 | Dudding et al. .......... | 301/124.1 |
| 6,799,811 | B1 * | 10/2004 | Dauber et al. ............ | 301/124.1 |
| 7,328,908 | B2 * | 2/2008 | Barber et al. .......... | 280/93.512 |
| 7,445,220 | B2 * | 11/2008 | von Mayenburg et al. ................... | 280/124.116 |

OTHER PUBLICATIONS

ArvinMeritor RideStar Ral Front Air Suspension, 2003 Mid-America Trucking Show, circa 2003.
Hendrickson USA, L.L.C., Composolite FX—Fixed-axle suspension system, circa 2006.

* cited by examiner

*Primary Examiner*—Toan C To
(74) *Attorney, Agent, or Firm*—Cook Alex Ltd.

(57) ABSTRACT

A fabricated vehicle axle is provided with a single piece main body having an inverted U-shaped configuration. The ends of the main body are curved upwardly to define a pair of gooseneck portions. A first king pin fixture having a king pin bore is secured to one of the gooseneck portions, while a second king pin fixture having a king pin bore is secured to the other gooseneck portion. A bottom plate is secured to the main body and has ends extending beyond the gooseneck portions to provide seats for the king pin fixtures.

35 Claims, 9 Drawing Sheets

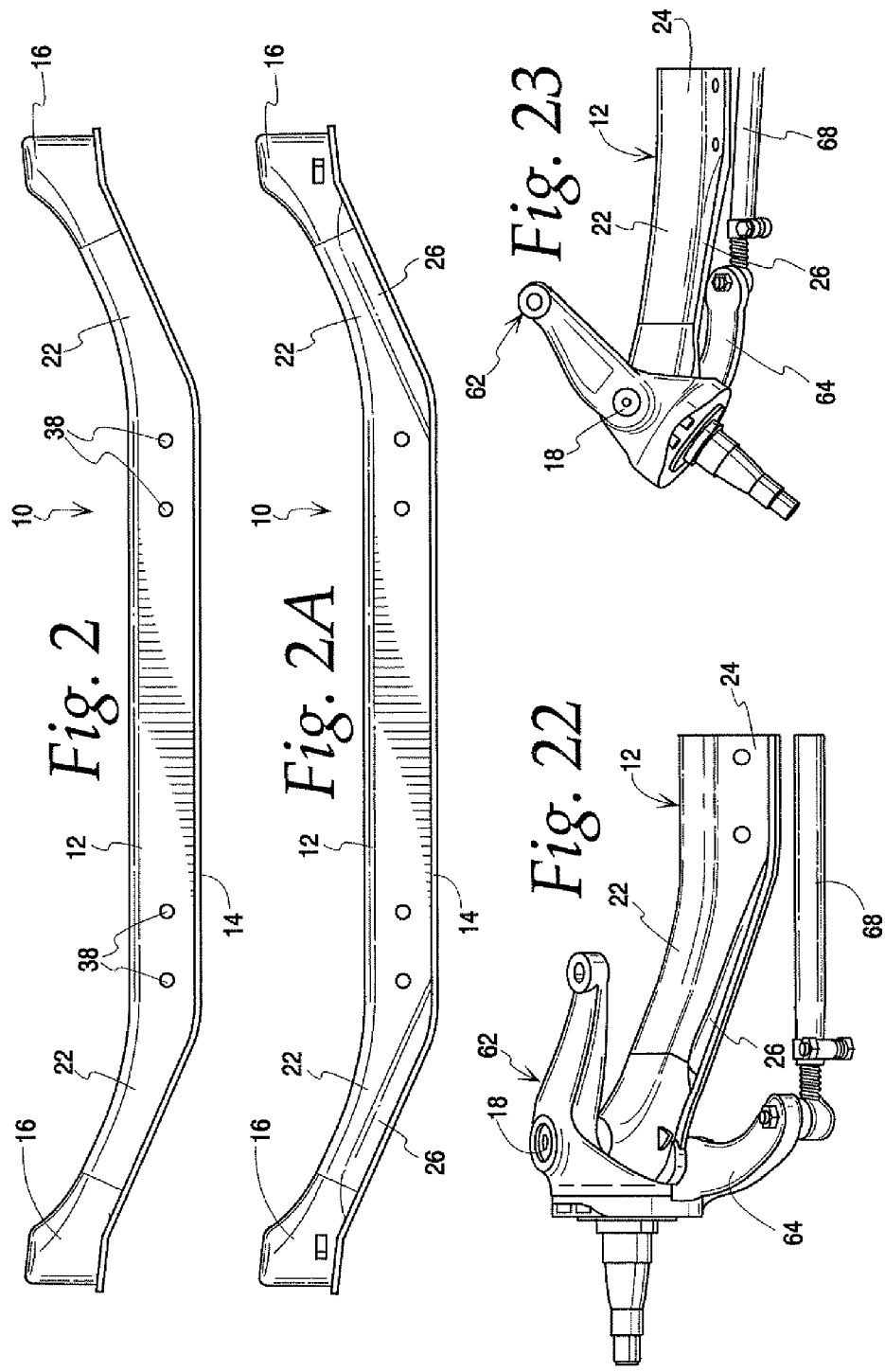

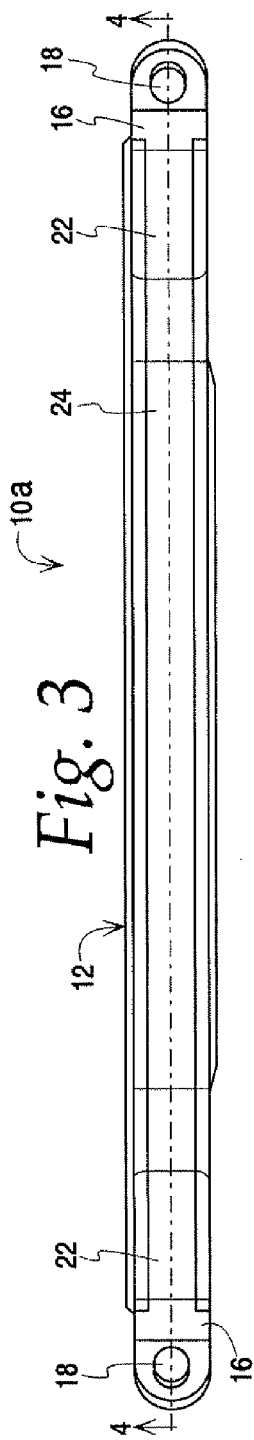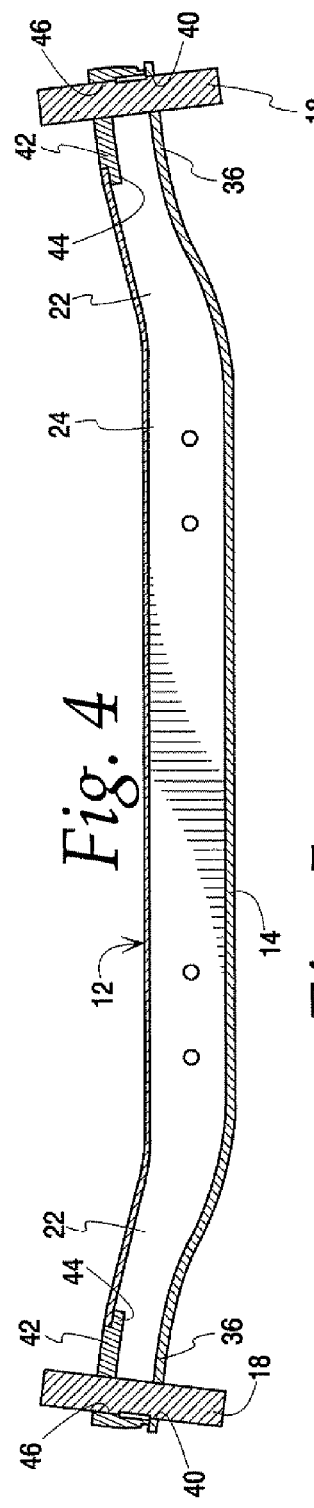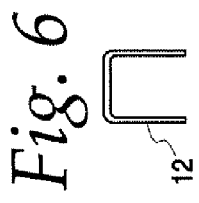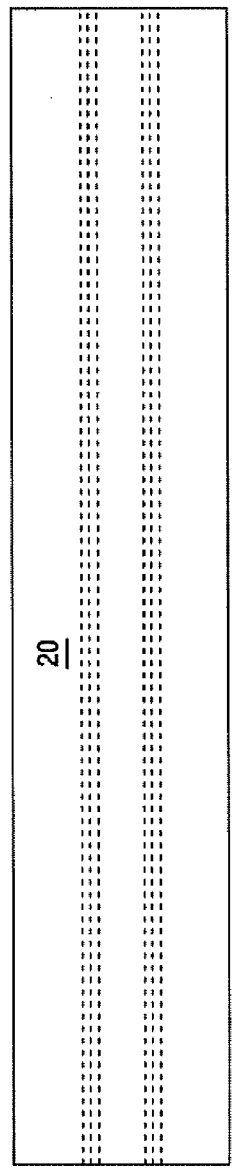

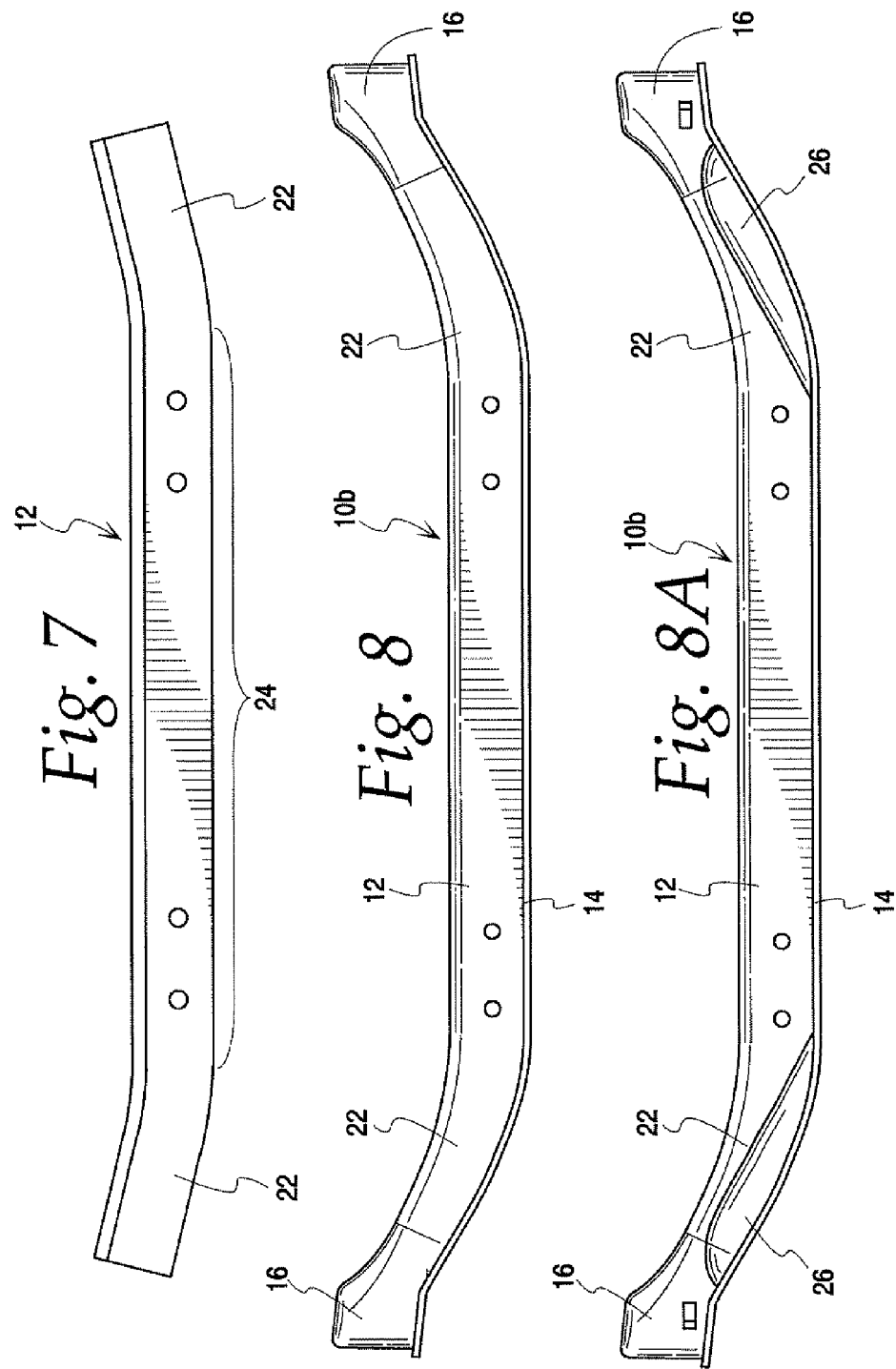

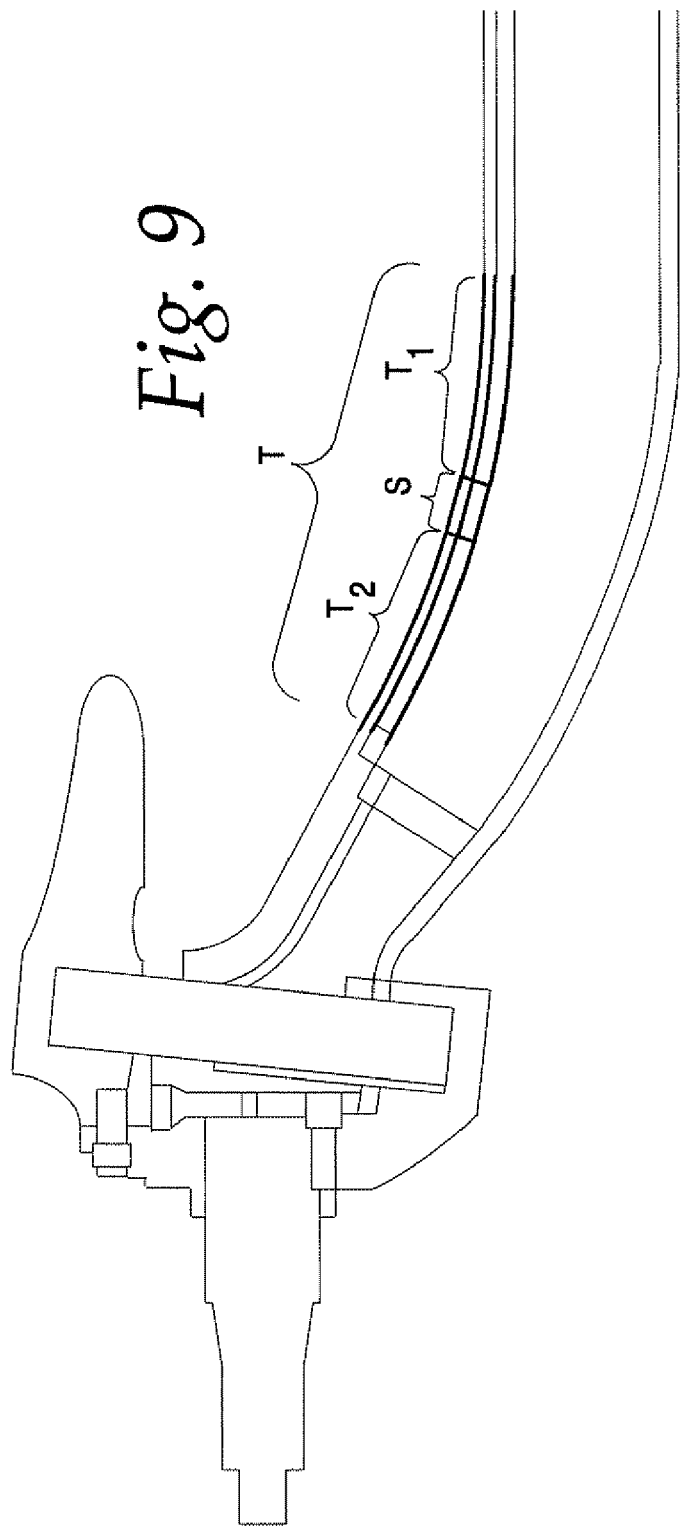

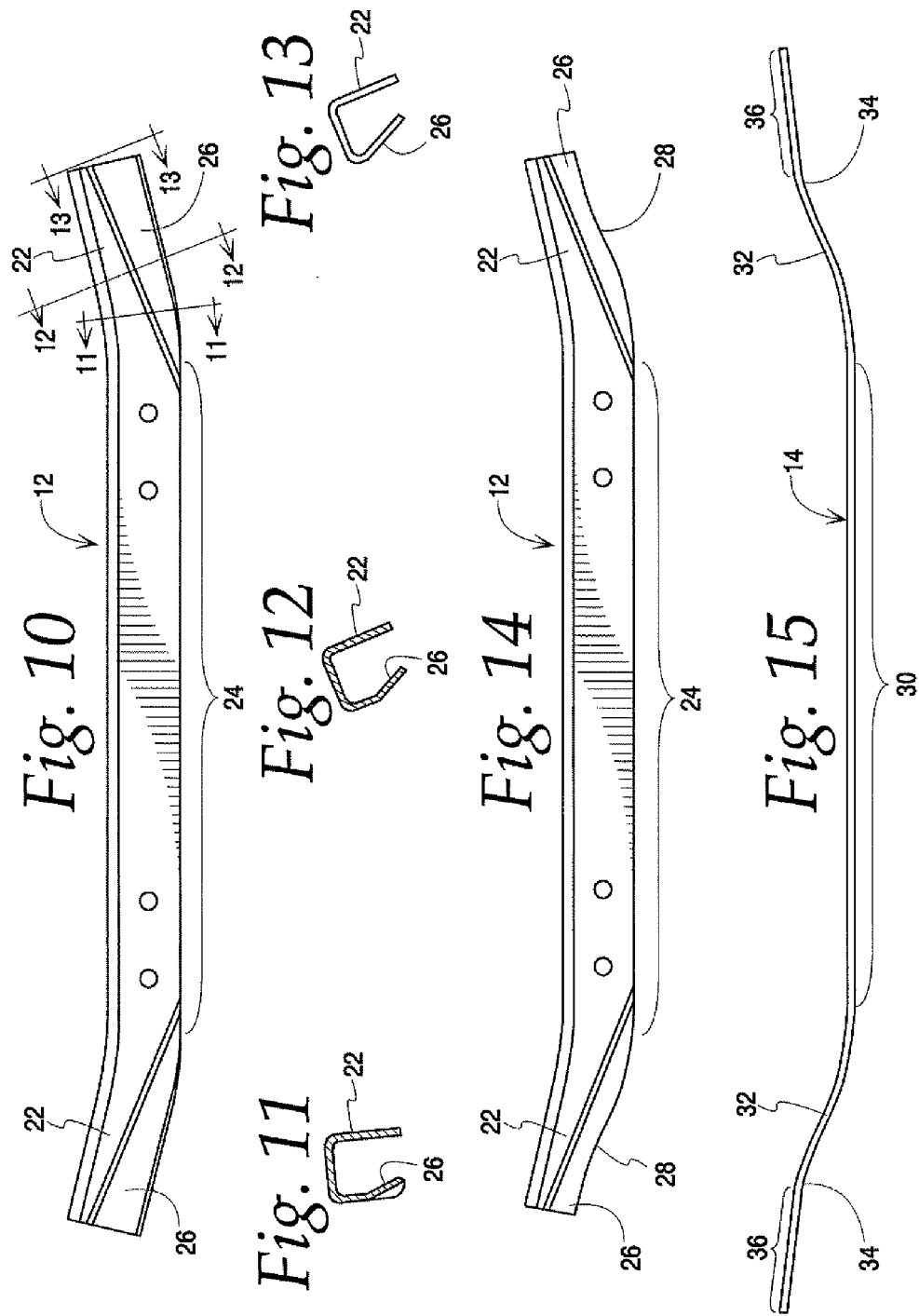

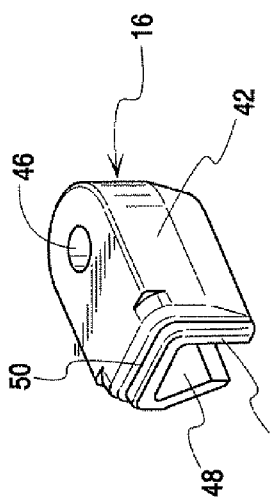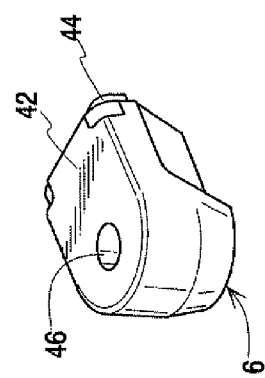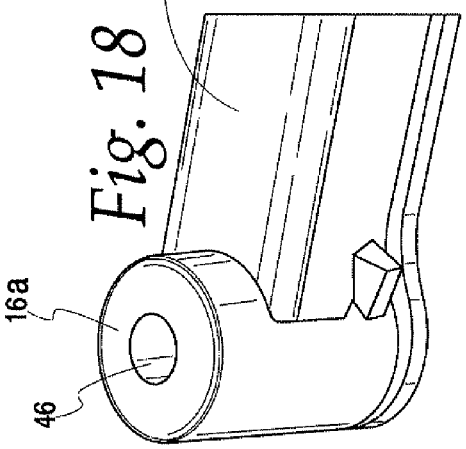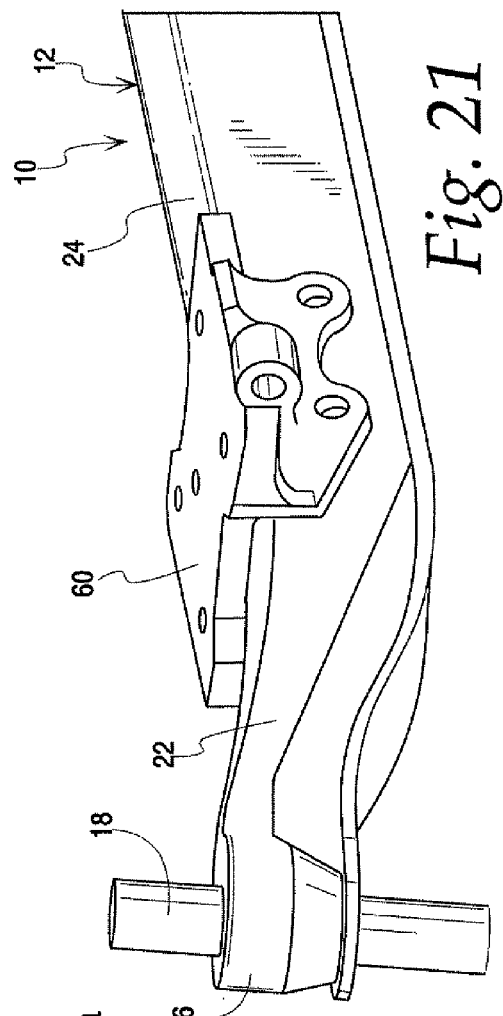

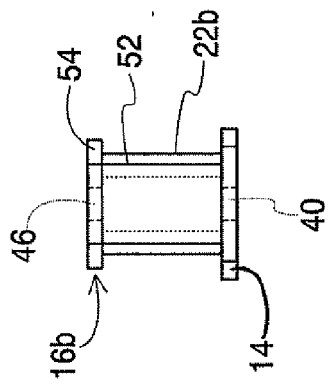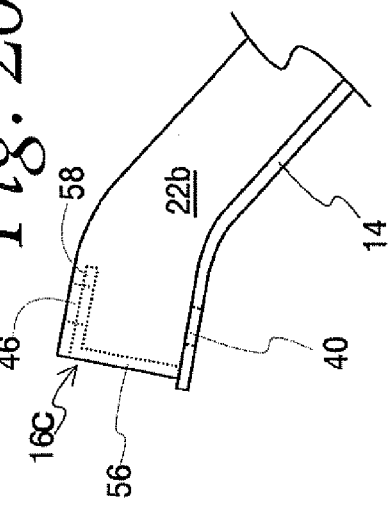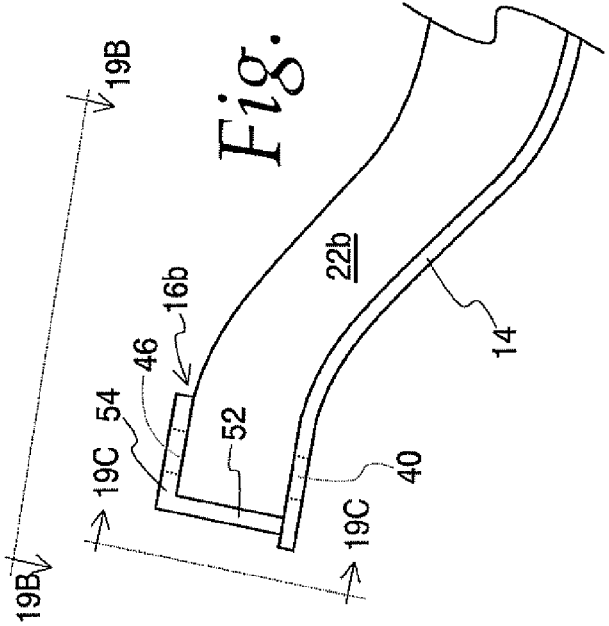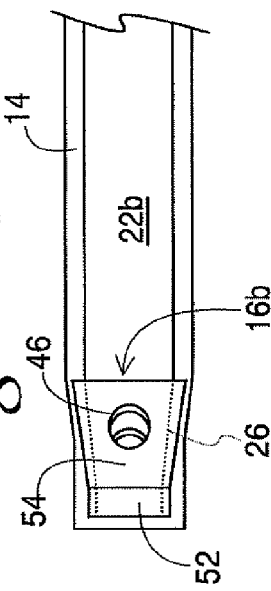

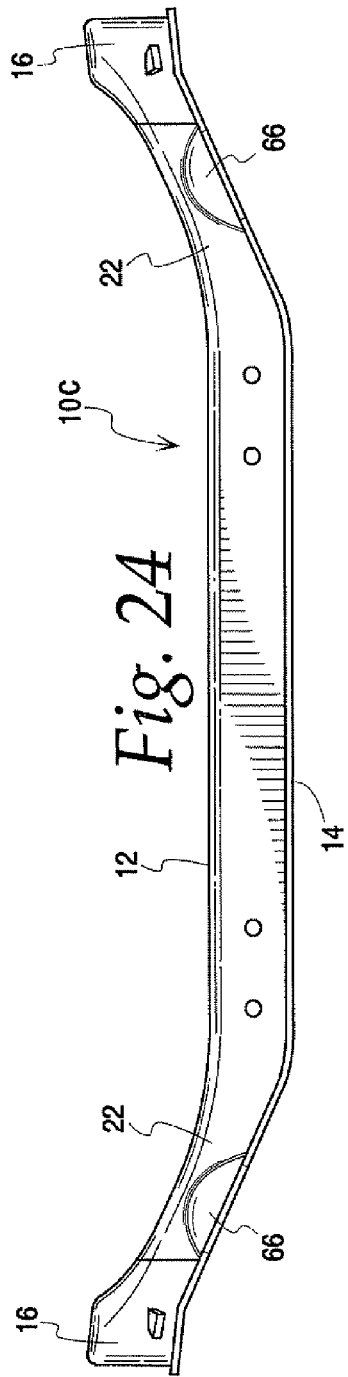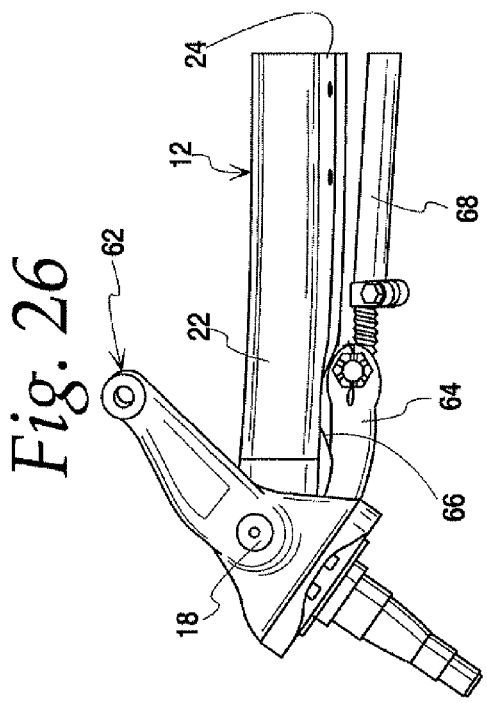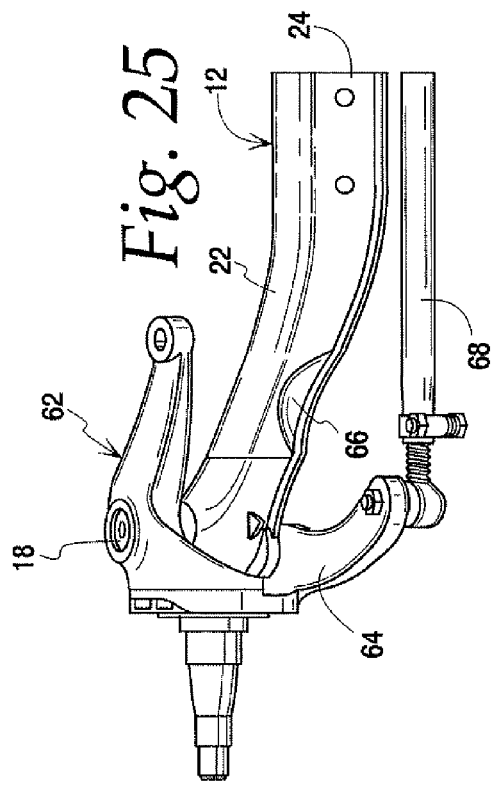

FABRICATED VEHICLE AXLE

BACKGROUND

1. Field of the Disclosure

The present subject matter relates generally to axles for vehicles and more particularly to fabricated axles for vehicles.

2. Description of Related Art

Typical steer axle assemblies for vehicles include a forged I-beam axle, and a pair of steering knuckles pivotally attached to opposite ends of the axle by way of king pins. Although they are generally strong and reliable, such forged I-beam axles are limited in their shape, are relatively heavy, and require a relatively large amount of machining. All of this translates into increased manufacturing and payload costs.

In light of the foregoing, fabricated axles have been developed. Such axles are typically manufactured from sheets of steel that are cut and then welded together. Fabricated axles generally weigh less than forged I-beam axles. For at least one known application, a forged I-beam steering axle for use with heavy-duty trucks weighs approximately one hundred ninety-five pounds, whereas an equivalent typical fabricated axle weighs approximately one hundred twenty-five pounds. In the case of commercial vehicles, including heavy-duty truck commercial vehicles, this translates into substantially increased payload capacity.

Another benefit of fabricated axles is that the material used (e.g., steel) can be spread around for more efficient distribution thereof. This can contribute to making the fabricated axle much lighter, and can even make it stiffer against both bending and torsion stresses. On top of all this, fabricated axles typically require less machining than forged I-beam axles. Accordingly, they are easier and less expensive to manufacture.

An example of a known fabricated axle is shown and described in U.S. Pat. No. 5,810,377, which is hereby incorporated herein by reference. The fabricated axle disclosed therein was a marked improvement over what was then the prior art and it is still useful for most purposes. However, it has now been recognized to have certain deficiencies. Principally, that fabricated axle does not utilize material efficiently, causing increased costs in manufacture and material waste.

This disadvantage led to the development of further improved designs. For example, the fabricated axle shown and described in U.S. Pat. No. 6,609,764, which is hereby incorporated herein by reference, addressed many of said deficiencies. In particular, the axle described in U.S. Pat. No. 6,609,764 employs a main body formed from a rectangular blank, with only a small amount of the blank being wasted.

While the axle described in U.S. Pat. No. 6,609,764 successfully reduced the amount of waste material, it was not without its own disadvantages. For example, the main body of the axle is relatively short, thus requiring the attachment of a number of relatively heavy components, such as a pair of top king pin plates and gooseneck parts. Additionally, the multiplicity of components may increase manufacturing costs and complexity. For example, one manufacturing process is described as employing a three-pass weld to secure the various components to each other.

FIG. 1 illustrates a portion of yet another known fabricated vehicle axle A. The axle A includes a straight main body B having a C-shaped cross-section and a continuous bottom plate P secured thereto. Separate goosenecks G (only one of which is illustrated) are welded to the ends of the main body B and to the bottom plate P. The goosenecks G are provided as cast components having a forked portion F, which provide an additional location by which to weld the gooseneck G to the main body B. In addition to their already heavy composition, the cast goosenecks G provide a relatively abrupt transition at the ends of the main body B, which further increases the weight of the axle A by requiring a three-pass weld to secure the gooseneck G and a portion of the main body B to the bottom plate P and rendering the material M under the gooseneck G redundant and effectively wasted.

Accordingly, it is desirable to overcome one or more of the foregoing shortcomings, or alternatively other shortcomings not specified herein but associated with prior fabricated axles.

SUMMARY

There are several aspects of the present subject matter which may be embodied in the devices and systems described and claimed below. These aspects may be employed alone or in combination with other aspects of the subject matter described herein.

In one aspect, a fabricated vehicle axle comprises a single piece main body with an inverted U-shaped configuration and including a midsection with upwardly curved gooseneck portions at each end thereof. The gooseneck portions are integrally formed with the midsection of the main body. A bottom plate is secured to the main body, with one end adjacent to one of the gooseneck portions and the other end adjacent to the other gooseneck portion. The axle further includes a first king pin fixture secured to the first gooseneck portion and having a first king pin bore extending therethrough. A second king pin fixture is secured to the second gooseneck portion and has a second king pin bore extending therethrough.

In another separate aspect, a fabricated vehicle axle and steering assembly comprise a single piece main body having an inverted U-shaped configuration and including a midsection and upwardly curved gooseneck portions at each end thereof. The gooseneck portions are integrally formed with the midsection of the main body. The axle further includes a bottom plate secured to said main body and having one end adjacent to and extending beyond one of the gooseneck portions and another end adjacent to and extending beyond the other gooseneck portion. A first king pin fixture is secured to a gooseneck portion and the associated end of the bottom plate. The first king pin fixture and the associated end of the bottom plate include substantially aligned king pin bores extending therethrough. A second king pin fixture is secured to the other second gooseneck portion and the associated end of the bottom plate. The second king pin fixture and the associated end of the bottom plate include substantially aligned king pin bores extending therethrough. King pins are received within the king pin bores, each king pin having connected thereto a steering knuckle including a tie rod arm. Each tie rod arm is connected to an end of a tie rod, thereby associating the steering knuckles to each other.

In yet another separate aspect, a fabricated vehicle axle includes a single piece main body having a midsection and upwardly curved gooseneck portions at each end thereof. The rear side of each gooseneck portion includes a tie rod arm clearance comprising an inwardly tapered section. The tie rod arm clearance feature cooperates with the associated steering assembly to maximize the degree of rotation of the steering assembly.

BRIEF DESCRIPTION OF THE DRAWINGS

In the following detailed description, reference will frequently be made to the following views of the drawing, in which like reference numerals refer to like components, and in which:

FIG. 2 is a front elevational view of a fabricated vehicle axle constructed in accordance with the principles and teachings set forth herein;

FIG. 2A is a rear elevational view of the fabricated vehicle axle of FIG. 2;

FIG. 3 is a top plan view of another fabricated vehicle axle constructed in accordance with the principles and teachings set forth herein;

FIG. 4 is a cross-sectional view of the fabricated vehicle axle of FIG. 3, taken through the line 4-4 of FIG. 3;

FIG. 5 is a top plan view of a rectangular strip of material used to form the main body of a fabricated vehicle axle provided according to the present disclosure;

FIG. 6 is an end view of the rectangular strip of material of FIG. 5 formed to have an inverted U-shaped cross-section;

FIG. 7 is a front elevational view of the rectangular strip of material of FIG. 6 formed to define a main body having a pair of upwardly curved gooseneck portions;

FIG. 8 is a front elevational view of another fabricated vehicle axle constructed in accordance with the principles and teachings set forth herein;

FIG. 8A is a rear elevational view of the fabricated vehicle axle of FIG. 8;

FIG. 9 is a cross-sectional view of an alternative fabricated vehicle axle constructed in accordance with the principles and teachings set forth herein;

FIG. 10 is rear elevational view of the main body of FIG. 7 formed to provide the gooseneck portions with tapered sections;

FIG. 11 is a cross-sectional view of a gooseneck portion of FIG. 10, taken through the line 11-11 of FIG. 10;

FIG. 12 is another cross-sectional view of a gooseneck portion of FIG. 10, taken through the line 12-12 of FIG. 10;

FIG. 13 is an end view of the gooseneck portion of FIG. 10, taken through the line 13-13 of FIG. 10;

FIG. 14 is a rear elevational view of the main body of FIG. 10, with part of the gooseneck portions being trimmed or removed;

FIG. 15 is a front elevational view of a bottom plate suitable for incorporation into a fabricated vehicle axle constructed in accordance with the principles and teachings set forth herein;

FIGS. 16 and 17 are perspective views of a king pin fixture suitable for incorporation into a fabricated vehicle axle constructed in accordance with the principles and teachings set forth herein;

FIG. 18 is a perspective view of an alternative king pin fixture and gooseneck portion suitable for incorporation into a fabricated vehicle axle constructed in accordance with the principles and teachings set forth herein;

FIG. 19A is a rear elevational view of another alternative king pin fixture and gooseneck portion suitable for incorporation into a fabricated vehicle axle constructed in accordance with the principles and teachings set forth herein;

FIG. 19B is a top plan view of the king pin fixture and gooseneck portion of FIG. 19A, taken through the line 19B-19B of FIG. 19A;

FIG. 19C is an end view of the king pin fixture and gooseneck portion of FIG. 19A, taken through the line 19C-19C of FIG. 19A;

FIG. 20 is a rear elevational view of yet another alternative king pin fixture and gooseneck portion suitable for incorporation into a fabricated vehicle axle constructed in accordance with the principles and teachings set forth herein;

FIG. 21 is a perspective view of a fabricated vehicle axle constructed in accordance with the principles and teachings set forth herein and including a king pin and axle bracket;

FIGS. 22 and 23 are perspective view of a fabricated vehicle axle constructed in accordance with the principles and teachings set forth herein and including steering assembly components;

FIG. 24 is a rear elevational view of an alternative fabricated vehicle axle constructed in accordance with the principles and teachings set forth herein; and FIGS. 25 and 26 are perspective views of the fabricated vehicle axle of FIG. 24, including steering assembly components.

DESCRIPTION OF SEVERAL EMBODIMENTS

Figure 1:
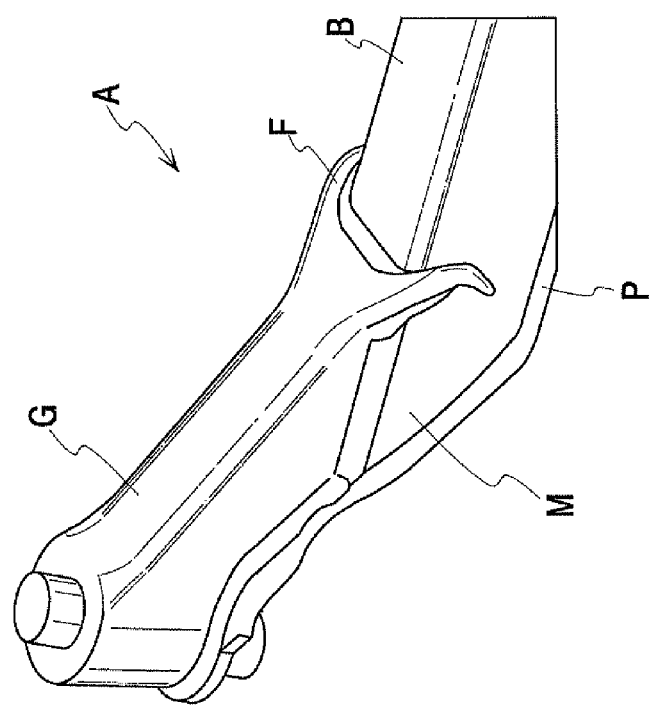
FIG. 1 is a perspective view of a fabricated vehicle axle constructed according to known design.

The embodiments disclosed herein are for the purpose of providing the required description of the present subject matter. These embodiments are only exemplary, and may be embodied in various forms. Therefore, specific details disclosed herein are not to be interpreted as limiting the subject matter as defined in the accompanying claims.

FIGS. 2 and 2A illustrate a fabricated vehicle axle generally designated 10 constructed in accordance with the principles set forth herein. The illustrated axle 10 includes a main body 12, a bottom plate 14, and two king pin fixtures 16 positioned on opposite ends of the main body 12. These components of the axle 10 are secured together, for example by a welding operation, along their respective points and lines of intersection.

FIGS. 3 and 4 illustrate a similar fabricated axle 10a and more particularly show the locations of the various components, including a pair of king pins 18, one of which is associated with each king pin fixture 16, as will be described in greater detail herein.

FIG. 5 illustrates a rectangular strip of material 20 used to form the main body 12. The strip of material 20 is first formed to have an inverted U-shaped configuration, as shown in FIG. 6. As used herein, the term "U-shaped" is used broadly and is not limited to the illustrated configuration having a pair of downwardly extending legs that are perpendicular to a top wall. Other configurations may include, for example, downwardly legs that are inclined with respect to the top wall or curved to provide a generally C-shaped cross-section.

The broken lines in FIG. 5 indicate the sections of the rectangular strip of material 20 that may be bent to form the U-shaped configuration of FIG. 6. Other methods of providing a U-shaped main body may also be employed without departing from the scope of the present disclosure.

Next, the ends of the main body 12 are formed to define upwardly curved gooseneck portions 22 (FIG. 7). The illustrated gooseneck portions 22 are substantially identical to each other and separated by a midsection 24 of the main body 12. The midsection 24 is shown as being substantially straight, but it may include a curvature without departing from the scope of the present disclosure.

In contrast to known designs, it will be seen that the gooseneck portions 22 are integral parts of the single piece main body 12, rather than being separate components secured to the main body. Further, the transition from the midsection 24 is smooth and there is no overlapping or redundant material at or adjacent to the gooseneck portions 22, in contrast to the fabricated axles described in U.S. Pat. No. 6,609,764 and the fabricated axle shown in FIG. 1.

The curved gooseneck portions 22 may be formed by any of a number of known beam-bending or rolling techniques, or other forming methods. Methods that may be used include:

(1) stamping in a male/female die set contoured to the final shape, (2) using a press brake with side bolsters to inhibit side wall deformation, (3) fluid cell (bag) press, (4) roll forming, (5) stretch forming, and (6) hydroforming (with later removal of the bottom section of the rectangular blank).

In one exemplary method of forming the gooseneck portions, a multi-piece mandrel is inserted into the open channel of the main body. The mandrel includes three pieces, with two of the pieces being relatively short end pieces (corresponding to the gooseneck portions) and the third being a longer central piece (corresponding to the midsection of the main body). The mandrel pieces are arranged end-to-end and generally prevent the main body from deforming inwardly during the forming process.

Each outer end of the end mandrel pieces is carried by a stationary support, with each inner end thereof being carried by an associated resilient support. Each resilient support also supports an end of the central mandrel piece. The resilient supports may be variously provided, such as deformable pads or hydraulic cylinders or the like to allow for pivoting of the end mandrel pieces (i.e., downward relative movement of the inner ends of the end mandrel pieces with respect to the outer ends thereof). A pivot mechanism is associated with each end mandrel piece to further facilitate such pivoting action. The pivoting action allows the end mandrel pieces to generally follow the shape of the gooseneck portions during the forming process.

A forming or radius die is provided above the main body, mandrel pieces, and supports. The forming die has an inverted U-shaped cross-section that defines a channel for receiving the main body. The sides of the channel are defined by side bolsters that generally conform to the downwardly extending legs of the main body and prevent the legs from bowing outwardly in the bend-effected zones during the process, thereby preserving a substantially uniform width along the main body. The top portion of the channel is pressed into contact with the top portion of the main body by a punch and is shaped like the final curvature of the main body. Due to material springback, the actual curvature of the gooseneck portions typically has a slightly greater radius of curvature than that of the top portion of the channel, which may be considered when designing the channel.

In use, the mandrel pieces are placed on the supports and the main body is positioned on the mandrel pieces. The forming die is then moved downwardly to contact the main body. The contoured top portion of the forming die channel forces the center of the main body downwardly as the resilient supports move downwardly to allow for such movement. The stationary supports maintain the ends of the main body at a higher elevation, thereby forcing the main body to bend in the areas between the stationary supports and the adjacent resilient support. The end mandrel pieces pivot about the associated pivot mechanism to allow for this bending of the main body. The presence of the mandrel and the side bolsters prevents the bent portions of the main body from deforming inwardly or outwardly, thereby maintaining the U-shaped cross-section of the main body at the bent gooseneck portions during and after forming.

The top and bottom of each gooseneck portion 22 may have differing radii, for example with the bottom radius being less than the top radius, as shown in the embodiment of FIGS. 2 and 2A. Alternatively, the top and bottom radii may be substantially the same, as in FIGS. 8 and 8A, which illustrate an alternative fabricated axle 10b. It may be advantageous for the bottom radius to be no greater than the top radius, otherwise the top and bottom of the gooseneck will diverge as the gooseneck extends toward the associated king pin fixture 16.

The radii of the gooseneck portions 22 may vary without departing from the scope of the present disclosure. Different radii will result in different axle characteristics. For example, a larger radius (e.g., as shown in FIGS. 8 and 8A) will result in a larger cross-section of the gooseneck portions, which tends to make the axle more robust. However, a smaller radius (e.g., as shown in FIGS. 2 and 2A) allows the gooseneck portion to begin farther from the center of the main body, thereby increasing the length of the midsection and making it easier to properly position and orient an axle bracket of an associated suspension system.

The geometry of the associated vehicle may also factor into the radii of the gooseneck portions 22. For example, the top bend angle (i.e., the bend angle of the top surface of the gooseneck portion) may be in the range of approximately 10° to approximately 50° off the horizontal. When used in combination with a domestic vehicle, a top bend angle in the range of approximately 30° to approximately 40° is typically suitable, whereas European vehicles typically require a smaller top bend angle, which can be in the range of approximately 10° to approximately 30°. While these bend angles have been found to be suitable for particular applications, bend angles below 10° or above 50° may also be employed without departing from the scope of the present disclosure.

Additionally, depending on the bend radius and the material used to form the main body, it may be advantageous to provide each bend as a combination of multiple smaller bends, to achieve the desired rise angle. For example, FIG. 9 shows an axle having a gooseneck portion with a composite bend T that is comprised of smaller bends $T_1$ and $T_2$. Providing the composite bend T as a combination of smaller bends $T_1$ and $T_2$ rather than as a single bend allows the desired rise angle to be achieved without unduly stressing the material. The smaller bends $T_1$ and $T_2$ may be separated by straight or unbent sections S to minimize stresses at the flange ends during the bending process and provide stability to the composite bend T.

In one embodiment, the gooseneck portions 22 are further formed to provide a tapered section 26 on the rear side of the main body 12 (FIGS. 2A, 8A, and 10). The tapered sections 26 may be formed simultaneously or sequentially with the gooseneck portions 22. The contours of the illustrated tapered sections 26 can be understood with reference to FIGS. 11-13, which show the cross-sectional shape of one of the gooseneck portions 22 at various locations. In particular, it will be seen that the angle of the tapered section 26 remains substantially the same, but the extent thereof (i.e., the portion of the rear leg of the gooseneck portion that is tapered) increases toward the outer end of the gooseneck portion 22. Additionally, as shown in FIG. 10, the tapered sections 26 may extend beyond the gooseneck portions 22 into the midsection 24 of the main body 12. The function of the tapered sections 26 will be described in greater detail herein.

With the gooseneck portions 22 and the tapered sections 26 so formed, the bottoms of the legs of the main body 12 may be trimmed (FIG. 14) to provide a relatively smooth curvature 28, which may be advantageous when securing the bottom plate 14 to the main body 12, as will be described in greater detail herein. Alternatively, the excess material may be removed earlier in the forming process, such as prior to the rectangular strip of material 20 being formed into the main body 12. Regardless of when this material is removed, it will be clear that it results in only a small amount of waste from the original rectangular strip of material 20.

FIG. 15 illustrates the bottom plate 14 of the fabricated axle 10. The bottom plate 14 is provided as a rectangular strip of material that is formed (e.g., by bending) to provide a substantially flat body portion 30 bounded by primary bends 32 and secondary bends 34 to match the contour of the bottom of the main body 12. The width of the bottom plate 14 may vary to correspond to the width of the main body, for example, being relatively narrow at the regions corresponding to the tapered sections of the main body.

The trimmed curvatures 28 of the gooseneck portions 22 provide a smooth, continuous surface, thereby allowing for the bottom plate 14 to be more easily and reliably secured to the main body 12. The bottom plate 14 is secured to the bottom of the main body 12, as shown in FIGS. 2 and 2A. The bottom plate 14 may be secured to the main body 12 by a welding operation, in which case the bottom plate 14 may be slightly wider than the main body 12 to provide a convenient welding surface.

As shown in FIG. 4, the bottom plate 14 may be longer than the main body 12, with the sections extending beyond the ends of the main body being sized and configured to define king pin fixture seats 36. Each king pin fixture seat 36 is provided with a king pin bore 40 to receive a king pin 18 (FIG. 4). It may be advantageous to provide as much material as possible surrounding each king pin bore 40 to provide maximum structural integrity.

In one embodiment, the bottom plate 14 is of constant thickness and has a constant section to provide adequate structural integrity at and adjacent to the king pin bores 40. It may be advantageous for the bottom plate 14 to be relatively thick (e.g., thicker than the material used to form the main body 12) to allow the vehicle to be jacked up at any point along the length of the body portion 30 without risk of damage. The robust thickness of the bottom plate 14 also provides foreign object protection so that the axle is not bent or damaged due to rocks, debris, and the like. It also provides a tie down for decking during transport. Further, a relatively thick bottom plate lowers the neutral axis of the section of the fabricated axle, which reduces tension stresses in the bottom plate and thereby extends its fatigue life.

In other embodiments, the bottom plate may have a tapered construction, as desired. In this construction, the bottom plate is still continuous, but is taper rolled or machined such that it has optimum, varying thickness at all locations. Other variations to the configuration of the bottom plate may also be employed without departing from the scope of the present disclosure. For example, the principles described in U.S. Pat. No. 6,609,764, previously incorporated herein by reference, with regard to bottom plates of a fabricated axle may be employed with fabricated axles according to the present disclosure.

FIGS. 16 and 17 illustrate one of the king pin fixtures 16 for the fabricated vehicle axle 10. The other king pin fixture is a mirror image of the illustrated king pin fixture and the following description applies equally to both king pin fixtures.

The king pin fixture 16 is hollow (as best seen in FIG. 17) and includes a head portion 42 and may also include a necked-down portion 44. A king pin bore 46 is machined through the head portion 42 at a position where it is designed to align substantially with the king pin bore 40 of the king pin fixture seat 36 on which the king pin fixture 16 sits and is eventually secured to (see FIG. 4). To ensure that the associated king pin bores 40 and 46 are properly aligned, it may be advantageous to first secure the king pin fixture 16 to the king pin fixture seat 36 and then simultaneously machine the bores 40 and 46.

The necked-down portion 44 of the king pin fixture 16 has a smaller cross-section than the head portion 42 (FIG. 17), which allows it to be received within the adjacent gooseneck portion 22 of the main body 12, as shown in FIG. 4. The illustrated necked-down portion 44 has an inclined sidewall 48 that corresponds to the tapered section 26 of the associated gooseneck portion 22 to provide a smooth transition from the main body 12 to the king pin fixture 16, thereby improving the fatigue life of the axle 10.

The interface between the head portion 42 and the necked-down portion 44 defines a lip 50 that abuts against the end of the associated gooseneck portion 22 to prevent the king pin fixture 16 from being over-inserted into the channel of the associated gooseneck portion 22. The lip 50 thereby assists in properly positioning the king pin fixture 16 before it is secured to the bottom plate 14 and the main body 12. The lip 50 may also serve as a surface by which the king pin fixture 16 is secured to the main body 12. The king pin fixture 16 may be secured to the bottom plate 14 and the main body 12 by any of a number of means, such as welding. If a welding operation is used to secure the king pin fixture 16, it may be advantageous for the king pin fixture seat 36 of the bottom plate 14 to extend beyond the perimeter of the head portion 42 to provide a convenient welding surface.

FIG. 18 illustrates an alternative king pin fixture 16a, which has a substantially cylindrical shape and is secured to a relatively elongated gooseneck portion 22a, thereby minimizing the size of the king pin fixture. The embodiment of FIG. 18 may be advantageous because the king pin fixture, although hollow, is relatively heavy compared to the rest of the axle. The principle function of the king pin fixture is to provide a durable connection point to a king pin, so it may be advantageous to eliminate any material that is not necessary to provide support and structure for the king pin bore. As shown in FIG. 18, the size of the king pin fixture may be minimized by maximizing the length of the main body, which includes the gooseneck portions, thereby requiring only a small king pin fixture. Other king pin fixture configurations may also be employed without departing from the scope of the present disclosure.

FIGS. 19A-19C illustrate another further alternative king pin fixture 16b, which is generally L-shaped, with an upstanding flange 52 and an overlaying flange 54. The gooseneck portion 22b extends substantially the length of the bottom plate 14, so only a small king pin fixture 16b is provided to close the open end of the main body channel (using the upstanding flange 52) and to cover the end of the top surface of the gooseneck portion 22b (using the overlaying flange 54). The overlaying flange 54 is secured to the outside of the gooseneck portion 22b to provide additional material and strength at the king pin bore 46. As shown in FIG. 19B, the king pin fixture 16b may be tapered to conform generally to a tapered section 26 of the gooseneck portion 22b, if provided.

FIG. 20 illustrates a variation of the king pin fixture 16b of FIGS. 19A-19C that provides an even smaller L-shaped king pin fixture 16c. The king pin fixture 16c of FIG. 20 is sized and configured to be substantially received within the main body channel, thereby effectively acting as a plug. The king pin fixture 16c has a width substantially the same as the channel, with the upstanding flange 56 having a height substantially the same as the channel. An underlaying flange 58 is comparable to the overlaying flange 54 of the king pin fixture 16b of FIGS. 19A-19C, with the exception that it fits within the channel and is secured to the inside of the gooseneck portion 22b.

With the fabricated axle 10 fully assembled, additional components may be added. For example, FIG. 21 shows an axle bracket 60 forming an axle seat for the suspension system secured, for example by mechanical fasteners, to the main body 12. A second axle bracket (not illustrated) is secured to the other side of the axle 10. As shown in the various figures, the main body may include through-holes 38 for receiving said mechanical fasteners.

To properly align the axle bracket 60, it may be advantageous to secure it to a flat portion of the midsection 24 of the main body 12. However, as desired, the axle bracket 60 may instead be at least partially secured to the curved gooseneck portion 22, depending on the configuration of the associated vehicle. For example, the axle bracket 60 may be simultaneously secured to both the gooseneck portion 22 and the midsection 24, effectively straddling the two sections of the main body 12. If being at least partially positioned on the gooseneck portion 22 would hamper the functionality of the axle bracket 60, the top or underside of the axle bracket 60 may be machined or otherwise configured, as desired. It will be appreciated that properly maintaining the integrity of the legs of the main body 12 at the gooseneck portions 22 (i.e., by not allowing them to deform or bow outwardly during or after the forming process), will allow for the easiest and most reliable connection between an axle bracket and the gooseneck portion 22.

FIG. 21 also illustrates a king pin 18, which is received within the aligned bores of one of the king pin fixtures 16 and the bottom plate 14. A steering knuckle 62 (FIGS. 22 and 23) is connected to the king pin 18 by known means. FIG. 23 illustrates the function of the tapered sections 26 of the gooseneck portions 22. In particular, the tapered sections 26 give more clearance to a tie rod arm 64 of the steering knuckle 62, thereby allowing for a greater degree of rotation. In the illustrated embodiment, the steering knuckle 62 can be rotated approximately 55° from the straight position of FIG. 22 before the tie rod arm 64 comes into contact with the axle 10.

FIGS. 24-26 illustrate an alternative fabricated axle 10c, which is provided with gooseneck portions 22 that have a punched or dimpled or cut-out section 66, rather than being tapered. The cut-out sections 66 resemble indentations in the rear side of the gooseneck portions 22 that provide the same function as the tapered sections, which is to accommodate an approximately 55° rotation of the steering knuckle 62 from a straight position before the tie rod arm 64 contacts the axle, as shown in FIG. 26.

A tie rod 68 is also shown in FIGS. 22 and 23, associated with the steering knuckle 62 according to conventional design. If necessary to provide additional clearance for the tie rod 68, the rear leg or wall of the midsection 24 of the main body 12 may be tapered or inclined inwardly, either to match the taper of the gooseneck portions 22 or to have an independent contour particularly suited for accommodating the tie rod 68.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A fabricated vehicle axle, comprising:
    a single piece main body having an inverted U-shaped configuration and including
        a midsection,
        an upwardly curved first gooseneck portion at an end of said midsection and integrally formed with the same, and
        an upwardly curved second gooseneck portion at an opposite end of said midsection and integrally formed with the same;
    a bottom plate secured to said main body and having a first end adjacent to the first gooseneck portion and a second end adjacent to the second gooseneck portion;
    a first king pin fixture secured to said first gooseneck portion and having a first king pin bore extending therethrough; and
    a second king pin fixture secured to said second gooseneck portion and having a second king pin bore extending therethrough.

2. The fabricated vehicle axle of claim 1, wherein said first king pin fixture is secured to the first end of the bottom plate and the second king pin fixture is secured to the second end of the bottom plate.

3. The fabricated vehicle axle of claim 2, wherein the first end of the bottom plate extends beyond the first gooseneck portion and the second end of the bottom plate extends beyond the second gooseneck portion.

4. The fabricated vehicle axle of claim 3, wherein the first end of the bottom plate is sized and configured to provide a seat for the first king pin fixture and the second end of the bottom plate is sized and configured to provide a seat for the second king pin fixture.

5. The fabricated vehicle axle of claim 4, wherein the first end of the bottom plate includes a third king pin bore therethrough in substantial alignment with said first king pin bore and the second end of the bottom plate includes a fourth king pin bore therethrough in substantial alignment with said second king pin bore.

6. The fabricated vehicle axle of claim 1, wherein a rear side of each of said first and second gooseneck portions includes a tie rod arm clearance comprising an inwardly tapered section.

7. The fabricated vehicle axle of claim 1, wherein a rear side of each of said first and second gooseneck portions includes a tie rod arm clearance comprising a cut-out section.

8. The fabricated vehicle axle of claim 1, wherein each king pin fixture comprises a necked-down portion received within the associated gooseneck portion of the main body and a head portion extending outside of the associated gooseneck portion.

9. The fabricated vehicle axle of claim 1, further comprising an axle bracket of a vehicle suspension system, wherein the axle bracket is at least partially secured to one of said gooseneck portions.

10. The fabricated vehicle axle of claim 9, wherein the axle bracket straddles the midsection of the main body and one of said gooseneck portions.

11. The fabricated vehicle axle of claim 1, wherein each gooseneck portion has a top radius and a bottom radius, the bottom radius being less than or equal to the top radius.

12. The fabricated vehicle axle of claim 1, wherein each king pin fixture includes a lip abutting an end of the associated gooseneck portion.

13. The fabricated vehicle axle of claim 1, wherein the midsection of the main body and the gooseneck portions have substantially the same width.

14. The fabricated vehicle axle of claim 1, wherein each gooseneck portion is defined in part by a composite bend comprised of a plurality of smaller bends.

15. The fabricated vehicle axle of claim 14, further comprising a substantially straight section intermediate adjacent smaller bends of the composite bend.

16. The fabricated vehicle axle of claim 1, wherein at least one of said king pin fixtures is generally L-shaped and comprises a flange secured to an outside portion of the associated gooseneck portion.

17. The fabricated vehicle axle of claim 1, wherein at least one of said king pin fixtures is generally L-shaped and comprises a flange secured to an inside portion of the associated gooseneck portion.

18. The fabricated vehicle axle of claim 17 wherein each gooseneck portion is defined in part by an upward bend having a bend angle between approximately 10° and approximately 50°.

19. A fabricated vehicle axle and steering assembly comprising, in combination:
- a single piece main body having an inverted U-shaped configuration and including
  - a midsection,
  - an upwardly curved first gooseneck portion at an end of said midsection and integrally formed with the same, and
  - an upwardly curved second gooseneck portion at an opposite end of said midsection and integrally formed with the same;
- a bottom plate secured to said main body and having
  - a first end adjacent to and extending beyond the first gooseneck portion and including a first king pin bore extending therethrough, and
  - a second end adjacent to and extending beyond the second gooseneck portion and including a second king pin bore extending therethrough;
- a first king pin fixture secured to said first gooseneck portion and said first end of the bottom plate and having a third king pin bore extending therethrough and in substantial alignment with said first king pin bore;
- a second king pin fixture secured to said second gooseneck portion and said second end of the bottom plate and having a fourth king pin bore extending therethrough and in substantial alignment with said second king pin bore;
- a first king pin received in said first and third king pin bores;
- a second king pin received in said second and fourth king pin bores;
- a first steering knuckle connected to the first king pin and including a first tie rod arm;
- a second steering knuckle connected to the second king pin and including a second tie rod arm; and
- a tie rod having an end connected to the first tie rod arm and having an opposite end connected to the second tie rod arm.

20. The fabricated vehicle axle and steering assembly of claim 19, wherein the first end of the bottom plate is sized and configured to provide a seat for the first king pin fixture and the second end of the bottom plate is sized and configured to provide a seat for the second king pin fixture.

21. The fabricated vehicle axle and steering assembly of claim 19, wherein a rear side of each of said first and second gooseneck portions includes a tie rod clearance comprising an inwardly tapered section.

22. The fabricated vehicle axle and steering assembly of claim 21, wherein the first steering knuckle is rotatable with respect to the first gooseneck portion and the first tie rod arm is adapted to contact the tie rod clearance of the first gooseneck portion when the first steering knuckle has been rotated approximately 55° from a straight position.

23. The fabricated vehicle axle and steering assembly of claim 19, wherein a rear side of each of said first and second gooseneck portions includes a tie rod clearance comprising a cut-out section.

24. The fabricated vehicle axle and steering assembly of claim 23, wherein the first steering knuckle is rotatable with respect to the first gooseneck portion and the first tie rod arm is adapted to contact the tie rod clearance of the first gooseneck portion when the first steering knuckle has been rotated approximately 55° from a straight position.

25. The fabricated vehicle axle and steering assembly of claim 19, wherein each king pin fixture comprises a necked-down portion received within the associated gooseneck portion of the main body and a head portion extending outside of the associated gooseneck portion.

26. The fabricated vehicle axle and steering assembly of claim 19, further comprising an axle bracket of a vehicle suspension system, wherein the axle bracket is at least partially secured to one of said gooseneck portions.

27. The fabricated vehicle axle of claim 26, wherein the axle bracket straddles the midsection of the main body and one of said gooseneck portions.

28. The fabricated vehicle axle of claim 19, wherein each gooseneck portion has a top radius and a bottom radius, the bottom radius being less than or equal to the top radius.

29. The fabricated vehicle axle of claim 19, wherein each king pin fixture includes a lip abutting an end of the associated gooseneck portion.

30. The fabricated vehicle axle of claim 19, wherein the midsection of the main body and the gooseneck portions have substantially the same width.

31. The fabricated vehicle axle of claim 19, wherein each gooseneck portion is defined in part by a composite bend comprised of a plurality of smaller bends.

32. The fabricated vehicle axle of claim 31, further comprising a substantially straight section intermediate adjacent smaller bends of the composite bend.

33. The fabricated vehicle axle of claim 19, wherein at least one of said king pin fixtures is generally L-shaped and comprises a flange secured to an outside portion of the associated gooseneck portion.

34. The fabricated vehicle axle of claim 19, wherein at least one of said king pin fixtures is generally L-shaped and comprises a flange secured to an inside portion of the associated gooseneck portion.

35. The fabricated vehicle axle of claim 19, wherein each gooseneck portion is defined in part by an upward bend having a bend angle between approximately 10° and approximately 50°.

* * * * *